Figure 1:
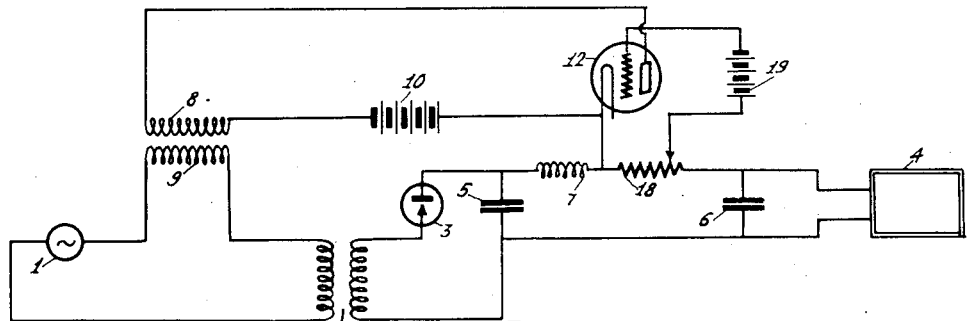

Oct. 22, 1935.    P. R. DIJKSTERHUIS    2,018,348
MEANS FOR CONTROLLING THE TERMINAL PRESSURE OF AN ELECTRIC DEVICE

Filed June 20, 1929

INVENTOR
P.R. DIJKSTERHUIS
BY
ATTORNEY

Patented Oct. 22, 1935

2,018,348

UNITED STATES PATENT OFFICE 2,018,348

MEANS FOR CONTROLLING THE TERMINAL PRESSURE OF AN ELECTRIC DEVICE

Popko Reinder Dijksterhuis, Eindhoven, Netherlands, assignor to Radio Corporation of America, a corporation of Delaware Application June 20, 1929, Serial No. 372,228
In the Netherlands July 31, 1928

3 Claims. (Cl. 175—363)

In the electric art it is often desired that the terminal pressure of a device supplied with electric current should be under controllable condition. Frequently this terminal pressure will vary according to variations in the load. It may equally well occur that it is desired to counteract this potential variation as that, in contradistinction, it may be desired to amplify it.

Thus, for example, in electric devices which are supplied via one or more impedance possessing devices, the potential loss which occurs in these impedance possessing devices and which causes the available terminal pressure to be smaller at load than in unloaded condition is often a source of trouble. This results in the necessity of dimensioning such an electric device for a higher voltage than its operating voltage. In other words it is impossible to increase the energy up to the amount for which the device is constructed. In such a case it may be desired that during operation the voltage should be increased by particular auxiliary means. An example in which this potential drop is inconvenient is constituted by a transmitting installation for wireless telegraphy in which via a transformer and a rectifying device provided with a so-called smoothing device direct current is supplied to the anodes of a plurality of transmitting valves and modulation tubes. The influence of the impedances connected in series with these anodes may be so great that on switching a load into the circuit, for example, by pressing the key which may be inserted in the grid circuit of one of the discharge tubes of the transmitting installation, the voltage falls a considerable extent. In this case the transmitting valves and other devices enclosed within the installation must therefore be calculated for a voltage which is substantially higher than that prevailing during the load. On the other hand they cannot be used for the full capacity for which they are intended so that frequently the installation operates with a poorer output than could be attained at full load which, of course, is very inefficient.

In contradistinction to this it may on the other hand be desired in some cases that if the load current has reached a given intensity the voltage should be reduced a certain extent in order to prevent an unduly high load current. A well-known means to ensure such a so-called resistance to short-circuit freedom is the series connection of one or more impedances which assist a fall of the terminal pressure at an increasing load current. This measure often possesses a limitation in the fact that such impedances give already a great potential loss even at a normal load, a difficulty which has already been referred to hereinbefore. In addition when using choke coils provided with a magnetic core as the series connected impedances there is a risk that just when these choke coils should principally play their part, consequently at very heavy load currents, the inductance decreases as a result of magnetic saturation and the risk can only be avoided by the use of a low induction and consequently a comparatively heavy magnet core. The present invention however permits of obviating the difficulties referred to in a simple manner.

The invention relates to an arrangement for controlling the terminal pressure of an electric device which is supplied directly or indirectly from a single or polyphase alternating current source, said arrangement being characterized in that the supply circuit has inserted in it one or more inductances (hereinafter referred to as choke coils) to which a second coil (hereinafter referred to as an auxiliary coil) is inductively coupled by means of a common core of magnetic material. This second coil has passing through it a direct current which is dependent on the load current or the terminal pressure of the device or on both and which causes variations in the reactance of the choke coil. In addition the core may have arranged on it a second auxiliary coil through which a separate direct current passes. The direct currents in the two auxiliary coils may have such a direction relative to each other that they magnetize the core in opposite directions that is, they counteract each other.

The direct current in an auxiliary coil may be rendered dependent on the load current by causing it to be influenced by the potential loss in an impedance inserted in the load circuit. In some cases it is of great advantage when means are provided for controlling the current in an auxiliary coil.

The auxiliary coil or coils may be inserted in the anode circuit of a triode in which the anode- or the grid voltage or both are dependent on the load current or the terminal pressure of the device or on both. In a particular case the grid circuit of the triode has inserted in it a switch by the closing or opening of which the grid is given such a voltage that practically no current flows in the anode circuit, said switch being adapted to be worked automatically and practically simultaneously with the switching of a load current into and out of the electric circuit.

The induction of alternating electro-magnetic forces in the direct current circuit in which the auxiliary coils are inserted may be prevented by connecting a plurality of auxiliary coils in series so that the sum of the electromotive forces induced in the auxiliary coils is at any moment practically equal to zero.

The invention also relates to a rectifying device which comprises an arrangement as above described for controlling the voltage between the points of connection to the direct current circuit. In addition the load circuit may have inserted in it a resistance and the direct current in one or more auxiliary coils may be dependent on the potential loss in said resistance. Preference should be given to a regulating resistance. One or more auxiliary coils may be connected in parallel to the said resistance. Alternatively, the latter may form part of the grid circuit of a triode the anode circuit of which has inserted in it one or more auxiliary coils. In another case the grid circuit of the triode has inserted in it either wholly or partly, a resistance by which the points of connection to the direct current circuit are made (it is understood that herein as is usually the case, a grid circuit is assumed to comprise all those circuit members which are connected in parallel, in series or otherwise between the grid and the cathode). In a particular case the grid and the incadescent cathode of the discharge tube have interconnected between them a switch and at normal terminal pressure of the rectifying device the potential of the grid relatively to the incandescent cathode is such that at the open position of the said switch practically no current flows in the anode circuit of the tube.

As an alternative the arangement may be such that the grid of the triode is connected to the incandescent cathode of the tube by the intermediary of a separate resistance which has connected in parallel to it a grid battery with switch. The switch inserted in the grid circuit of a discharge tube may be mechanically connected directly or indirectly to a switch for the load current or again it may form part of a relay which works under the influence of the load current. The anode current of the triode in a rectifying device according to the invention is not necessarily supplied by a separate source of direct current but may be supplied by the rectifying device itself.

Figure 2:
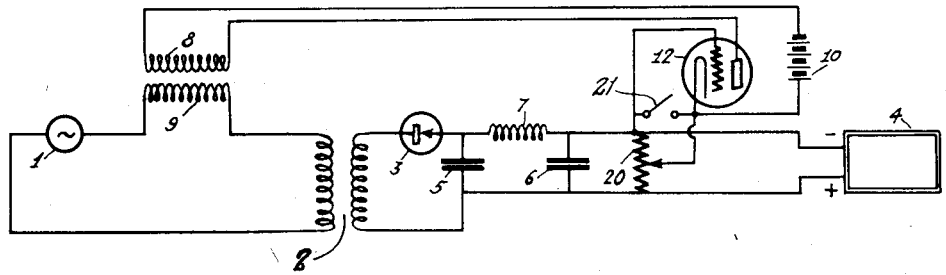
Figure 3:
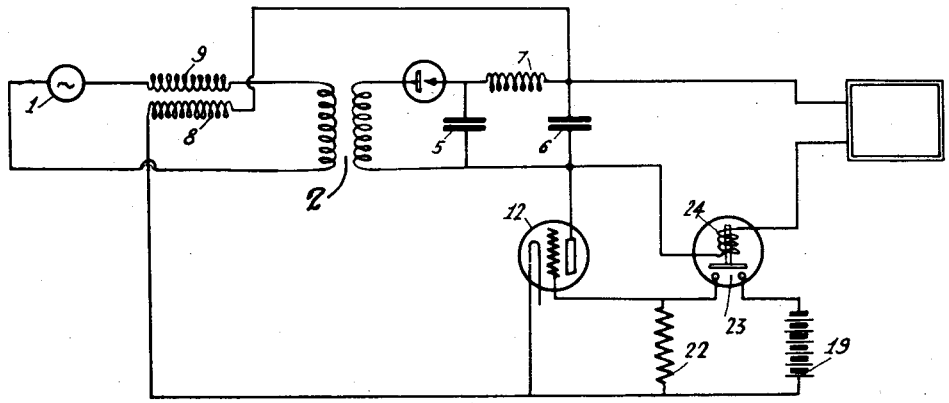

The invention will be more clearly understood by reference to the accompanying drawing in which various diagrams of connections relating to the arrangement or the rectifying device according to the invention are illustrated. In said drawing Figure 1 illustrates a method of applying the present invention by the use of a space discharge tube; Figure 2 illustrates another circuit arrangement embodying a space discharge tube employing a grid; and, Figure 3 illustrates a preferred embodiment of the invention which utilizes a novel relaying device.

Figure 1 shows a circuit arrangement according to which the magnetizing direct current in the coil system 8 is supplied by a separate source of current 10. The relay by means of which the load current controls the direct current in the coil 8 is here the triode 12. Its grid circuit has inserted in it part of a resistance 18 through which the load current passes and a grid battery 19 the voltage of which is preferably such that at a normal load the voltage of the battery 19 and the potential loss in the resistance 18 balance each other or impart to the grid a resulting positive voltage so that the discharge tube is conducting and the magnetizing direct current can flow through the auxiliary coils 8, whereas at no-load or at feeble loads the potential of the grid relatively to the incandescent cathode is so highly negative that no or only little current is allowed to pass through the discharge tube. It is, of course, obvious that as an alternative the resistance 18 may be inserted in the smoothing coil 7.

In the arrangements or rectifying devices according to the invention set out hereinbefore it was the load current which influences the direct current in the coil system 8. Figure 2 shows a diagram which has reference to a rectifying device in which the direct current in the auxiliary coils 8 is also under the influence of the terminal pressure. A resistance 20 connects here the two supply-leads for the direct current and is tapped by a conductor which connects to the incandescent cathode of the triode 12. The positive pole of the rectifying device is connected to the grid. The anode is connected to the incandescent cathode with the interposition of an anode battery 10 via the coil system 8. By means of a switch 21 the part of the resistance comprised between the tapping point and the positive conductor can be short-circuited. In this case the grid has cathode potential and a discharge current flows. According to the invention the switch 21 may be mechanically connected directly or indirectly connected to a switching device by means of which a load is switched into the circuit, so that as soon as the load current starts flowing the voltage is increased. The term "mechanically connected directly or indirectly" is to be understood to mean that the switch which causes the discharge current to pass through the tube or breaks it and the switching device by means of which a load is switched into the circuit are coupled either directly or indirectly (for example by the intermediary of a relay or the like) so that working one of these two switching devices has the effect of closing or breaking the other at substantially the same moment. The load may be switched into the circuit, for example, by means of a key which is inserted in the grid circuit of one of the discharge tubes of a transmitting installation and this key may possess one or more auxiliary contacts that connect to the grid and the incandescent cathode of the discharge tube 12. As an alternative, the switch 21 may, however, be worked by a relay which is controlled by the load current. The tapping of the resistance 20 may be such that at a normal voltage no current flows through the discharge tube 12. In this case the part of the resistance 20 which is inserted in the grid circuit must have such a value that the voltage drop along this part is about equal to $$V_g = -\frac{V_a}{g}$$

where $V_a$ designates the anode voltage and $g$ the amplifying factor of the tube. If the terminal pressure falls, the grid voltage of the tube also varies and the arrangement may be such that at a terminal pressure below the normal value a discharge current starts flowing and the more the terminal pressure falls, the heavier is this current. An unduly great fall of the terminal pressure is prevented by the passage of the discharge current through the relay 12.

As a direct current source is already at disposal in the rectifying device itself, the anode current for the triode 12 may be obtained from it and the tapping may be such that the voltage is divided approximately in the ratio $$\frac{1}{g}$$

by the tapping of the resistance 20. In this case the tube will be currentless practically so long as the switch 21 is opened.

Another arrangement in which the anode current of the tube is supplied by the rectifying device itself is finally shewn in Figure 3. Here the grid of the discharge tube is connected to the incandescent cathode by resistance 22. At the same time the grid may be connected thereto via a grid battery 19 by closing a switch 23. The anode voltage and consequently also the anode current which again is passed through the auxiliary coils is dependent upon the terminal pressure of the rectifying device but now in that sense that the more the terminal pressure falls the magnetizing current decreases which results in that if at the opened position of the switch 23 the load increases to such an extent that there would be a risk of overload the voltage is reduced so that the load current is kept between definite admissible limits. Similar to the switch 21 in the device shewn in Figure 2, the switch 23 may be coupled to the switching device for the load so that it is opened and consequently the discharge tube 12 becomes conducting at substantially the same moment at which the load starts flowing and consequently the voltage is not lower at normal loads than at no-load. According to the arrangement shewn in Figure 3, the switch is, however, worked by a relay 24 which is under the control of the load current. The voltage of the battery 19 is here preferably such that at the closed position of the switch 23 no or practically no current passes through the tube.

What I claim is:—

1. A circuit including a source of alternating current, a rectifier circuit coupled thereto, a filter circuit coupled to said rectifier circuit, a load circuit, a variable impedance in said first named circuit, a space discharge device having an input and an output circuit, said output circuit being shunted across said filter circuit and including means for controlling said variable impedance in accordance with the flow of current in said output circuit, said input circuit including a resistance, an auxiliary source of current, means for shunting said auxiliary current source across said resistance comprising a relay device, means for connecting said filter circuit to said load circuit, including means for energizing said relay whereby said relay device is affected in accordance with the intensity of current flowing from the filter output to the load.

2. In a power supply system, a primary circuit including a source of alternating current, a rectifier device associated with said source for rectifying the alternating current, a filter circuit connected to the rectifier output, a load circuit, a variable impedance in said primary circuit, a space discharge device having an input circuit and an output circuit, said output circuit being shunted across said filter circuit, means in said output circuit for controlling said variable impedance in accordance with the flow of energy in the output circuit, said input circuit including a resistance, an auxiliary source of current, means for connecting said auxiliary source of current across the resistance comprising a relay device, means for connecting said filter circuit to said load circuit including means for energizing said relay device whereby said relay is affected in accordance with the intensity of current flowing from the filter output to the load.

3. In a power supply system a source of alternating current, means for rectifying current therefrom, a load circuit and means for connecting the load circuit to the output of said rectifying means, means associated with said source adapted to control the current therefrom, a controlling circuit for said last named means including an electronic relay device having an input circuit and an output circuit, said output circuit being connected across the rectifier output whereby the space current for said relay is supplied from the rectifier output, means in said output circuit associated with said current control means for determining the effectiveness of the current control means in accordance with the flow of current through the relay output circuit and means in said relay input circuit associated with said second named means for determining the impedance to the flow of current in said relay output circuit in accordance with the flow of current from said rectifier output to the load through said connecting means.

POPKO REINDER DIJKSTERHUIS.